(12) United States Patent
Boyle et al.

(10) Patent No.: US 8,179,804 B2
(45) Date of Patent: May 15, 2012

(54) INTERNAL/EXTERNAL NETWORK IDENTIFIER

(75) Inventors: Frank J. Boyle, Denver, CO (US); Gordon R. Brunson, Broomfield, CO (US); Chandra Ravipati, Thronton, CO (US)

(73) Assignee: Avaya Inc., Basking Ridge, NJ (US)

( * ) Notice: Subject to any disclaimer, the term of this patent is extended or adjusted under 35 U.S.C. 154(b) by 191 days.

(21) Appl. No.: 12/493,031

(22) Filed: Jun. 26, 2009

(65) Prior Publication Data

US 2010/0329121 A1    Dec. 30, 2010

(51) Int. Cl.
*G01R 31/08*    (2006.01)

(52) U.S. Cl. ............... 370/241; 370/400; 370/395.3; 370/278; 370/352; 370/271; 709/229; 709/227; 709/250; 709/217; 709/218; 709/230

(58) Field of Classification Search .................. None
See application file for complete search history.

(56) References Cited

U.S. PATENT DOCUMENTS 7,305,479 B1 * 12/2007 Morris et al. ............... 709/229
7,609,687 B2 * 10/2009 Kobayashi et al. ......... 370/356

OTHER PUBLICATIONS

Rosenberg et al., "SIP: Session Initiation Protocol", RFC 3261, available at www.ietf.org/rfc/rfc3261.txt, Jun. 2002, 252 pages.

\* cited by examiner

*Primary Examiner* — Kibrom T Hailu
(74) *Attorney, Agent, or Firm* — Sheridan Ross P.C.

(57) ABSTRACT

Methods, devices, and systems are provided for marking one or more entities of a call as internal/external such that certain call features can be invoked by servers and other devices residing behind a gateway. More specifically, entities of a call can be marked as internal/external based employing an assessment algorithm to determine whether the calling endpoint is an internal or external endpoint and/or whether a user of the calling or answering endpoint is an internal or external user. Once this determination is made, the call can be marked accordingly such that the appropriate features can be invoked.

20 Claims, 3 Drawing Sheets

INTERNAL/EXTERNAL NETWORK IDENTIFIER

FIELD OF THE INVENTION

The invention relates generally to communications and more specifically to call marking mechanisms.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses or phone numbers.

During communications it is sometimes desirable to know whether an incoming call is being received from an internal caller (i.e., the originating device is inside an enterprise network or a user is using an internal member) or external caller (i.e., the originating device is outside the enterprise network or a user is using an external member). Furthermore, as networks and their services become more intertwined and converged, it is desirable to specifically know the network membership status of entities including one or more of 1) the device initiating the request, 2) the user on whose behalf the device is operating, 3) the user towards whom the request is being targeted and 4) the device which has ultimately answered the request. In other words, it is desirable to know the network membership status of each entity participating in a call so as to determine appropriate trust and communications handling for those entities.

Some devices are enabled to use such information and condition the call based on whether it is to/from an internal or external device (or internal or external user). Unfortunately, in the current SIP architectures, the device (usually a server) controlling the enhanced functionality is behind a gateway, so it cannot easily and unilaterally determine whether the call is internal or external based on known solutions, since the gateway masks whether the call is internal or external.

In fact, most prior art solutions rely on the fact that a call was received along a particular circuit-switched path to determine whether the call is internal or external. This was easy to implement because a PBX would have a dedicated port connected directly to the PSTN. Any calls received at that port were, by definition, external. Thus, calls are traditionally marked based on path traveled. Unfortunately, this solution is not suitable for use in many SIP architectures.

Additionally, in many converged network architectures, the identifiers of participants and their devices are a mixture of private and public numeric, alphanumeric, domain-specific and possibly adapted addresses lacking simple rules to determine network membership. Furthermore virtual enterprises are now willing to adopt specific entities from external networks into their internal membership ranks so as to consider them as members of the enterprise network. The rules associated with determining network membership may be complex and impractical for each network device to calculate for themselves. It is therefore desirable to perform the membership calculations in one location, and provide the results as a marking that can be easily consumed by every entity operating in the enterprise network.

SUMMARY

It is, therefore, one aspect of the present invention to provide a solution that can mark communications entities as internal or external based on certain criteria. More specifically, entities are marked, not based on a path the call traveled, but based on an algorithmic assessment of the information provided in the request. This algorithmic assessment may include testing against number-ranges, dial-plans, routing rules, statements of network policy, and matching entity information against information contained within provisioned tables and directories. Once an internal/external determination is made based on the algorithmic assessment, the entity is marked so that its membership can easily be identified as external or internal and the appropriate features can be invoked. On any given request or response, multiple entities (multiple headers) may be marked with the internal/external indication. Thus, for example, each of the entities originating device, originating user, recipient device, recipient user, may be marked as internal/external according to the algorithmic assessment. In SIP, headers such as the Request-URI, P-Asserted-Identity, and Contact are prime candidates for marking, although additional entities may also benefit from the marking.

It is another aspect of the present invention that the markings of internal/external identifiers follow the call as it travels throughout an internal and trusted network (e.g., an enterprise network). This allows devices behind a gateway to quickly identify whether a call is internal or external and apply the appropriate functionality to that call. In accordance with at least some embodiments of the present invention, the call is marked at the infrastructure layer (e.g., in one or more call headers) so that multiple applications and devices can access the same information.

It is another aspect of the present invention to provide a mechanism for "cleaning" calls of any markings before or when they enter a trusted network from an external network (e.g., the PSTN). Accordingly, embodiments of the present invention are adapted to prevent fraudulent use of call marking. More specifically, a device executing a call marking/unmarking algorithm in accordance with embodiments of the present invention may be designed, if the incoming request comes from an untrusted source, to remove any tag that arrives on that request, thereby cleaning the request and preventing fraudulent markings or tags.

In accordance with at least some embodiments of the present invention a method is provided that generally comprises:

receiving a call at a network boundary device;

performing an assessment algorithm on entities within the call request to determine the internal/external membership of each entity; and marking the entity with an internal/external identifier based on the results of the assessment algorithm.

In accordance with at least some embodiments of the present invention a number of different features may be invoked or withheld based on call markings. As one example, a particular ring type may be set based on whether a call is being received from an external or internal device. As another example, call restriction or call termination may be invoked based on whether a call is originating from an internal or external device or whether the call is directed toward an internal or external device (e.g., an internal device is not allowed to receive toll calls from an external device).

Another features which depends upon knowing whether a device is internal or external and which can be enabled with embodiments of the present invention includes an Extension to Cellular feature (EC-500). EC-500 is an advanced mobility feature that loosely couples an off-PBX telephone number (cell phone number, home phone, etc.) with an enterprise telephone number such that when the enterprise number is alerted, the call is extended at the same time to the off-PBX number. The call may be picked up at either device by the user. It is desirable to generalize this feature such that the off-PBX number may be used in a business context for both incoming and outgoing calls. This is where it may become useful to identify calls as being external when they are received from the off-PBX number, so that the necessary call processing can be performed. Other features which leverage an internal/external differentiation, while not explicitly mentioned, may also be used in accordance with at least some embodiments of the present invention.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to mark calls based on certain properties of that call.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
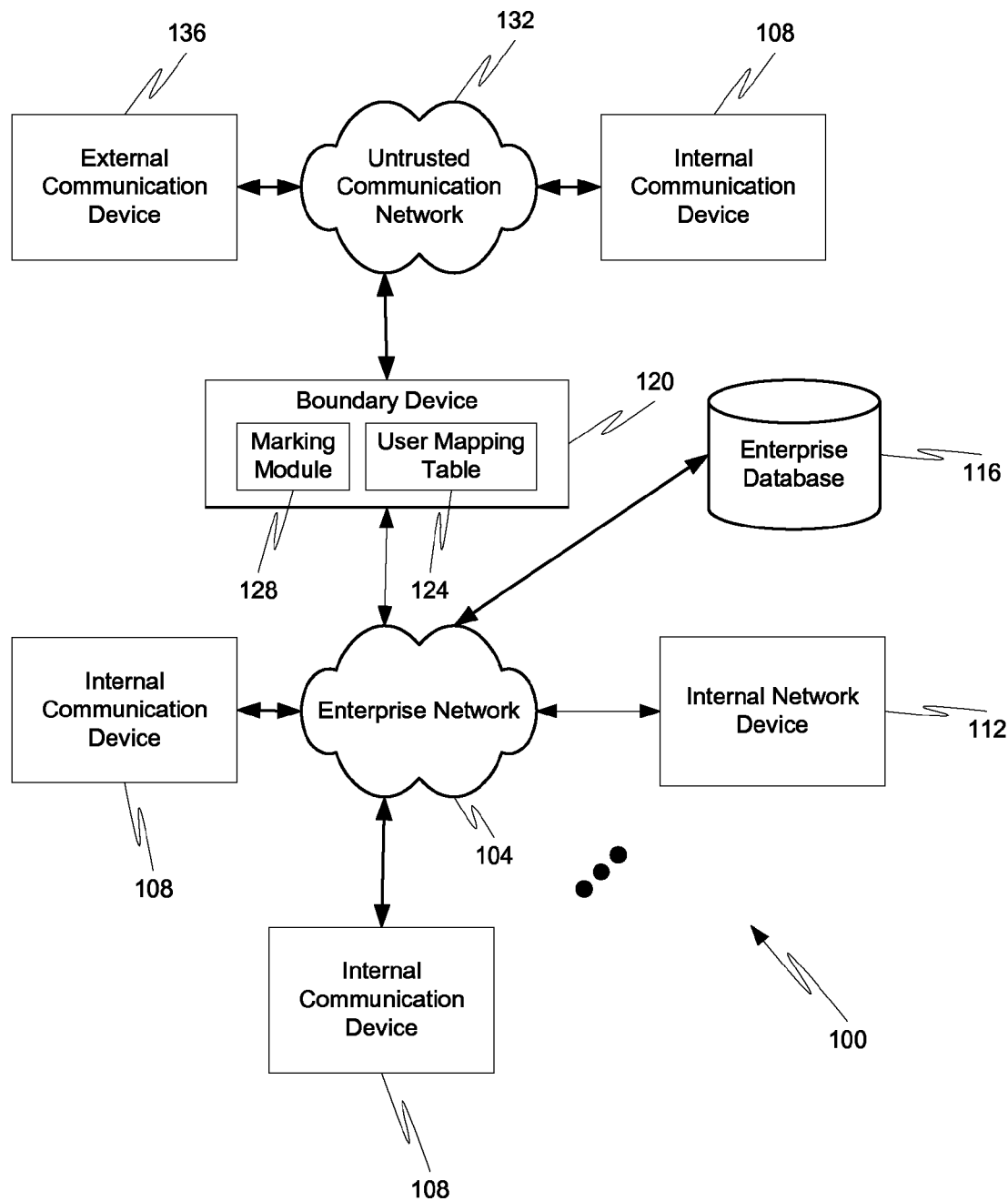
FIG. 1 is block diagram depicting a communication system in accordance with at least some embodiments of the present invention.

With reference initially to FIG. 1, an exemplary communication system 100 will be described in accordance with at least some embodiments of the present invention. More specifically, the communication system 100 includes an enterprise communication network 104 adapted to interconnect one or more communication devices 108 with an internal network device 112. The internal network device 112 may correspond to any type of application or feature server. More specifically, the internal network device 112 may correspond to a SIP application or feature server that is adapted to provide SIP functions to one or more of the internal communication devices 108. More broadly, the internal network device 112 may provide selected features and application to internal users, who may or may not necessarily be using an internal communication device 108. One example of the internal network device 112 is the Communications Manager produced and sold by Avaya, Inc.

The enterprise communication network 104 may be any type of known communication medium or collection of communication mediums and may use any type of protocols to transport messages between endpoints. The enterprise communication network 104 may include wired and/or wireless communication technologies. Examples of an enterprise network 104 include a Local Area Network (LAN), a Wide Area Network (WAN), a Session Initiation Protocol (SIP) network, and any other type of packet-switched or circuit-switched network known in the art. In addition, it can be appreciated that the enterprise communication network 104 need not be limited to any one network type, and instead may be comprised of a number of different networks and/or network types.

The enterprise network 104 may be connected to an external communication network 132 via one or more network boundary devices 120. One example of the network boundary device 120 is the Aura Session Manager produced and sold by Avaya, Inc. The external communication network 132 may comprise any type of non-enterprise network (e.g., any network not secured and/or administered by enterprise personnel). The Internet is an example of the external communication network 132 that constitutes and IP network consisting of many computers and other communication devices located all over the world, which are connected through many telephone systems and other means. Other examples of the external communication network 132 include, without limitation, a standard Plain Old Telephone System (POTS), an Integrated Services Digital Network (ISDN), the Public Switched Telephone Network (PSTN), any type of known cellular communication network, and combinations thereof.

In accordance with at least some embodiments of the present invention, communications between internal communication devices 108 and external communication devices 136 (i.e., communication devices not registered with the enterprise or communication devices not being used by a registered enterprise user) can be facilitated through the one or more network boundary devices 120. The external communication devices 136 may be similar to the internal communication devices 108 in that either device may be any type of known communication or processing device such as a personal computer, laptop, Personal Digital Assistant (PDA), cellular phone, smart phone, telephone, analog phone, DCP phone, or combinations thereof. A single communication device 108, 136 may be controlled by or be associated with a single user or may be adapted for use by many users (e.g., an enterprise communication device that allows any enterprise user to utilize the communication device upon presentation of a valid user name and/or password).

Two or more of the communication devices 108, 136 may be associated with the same user. In other words, the communication devices 108, 136 may belong to a single user and may correspond to different types of communication devices. As one example, an enterprise user may have four internal communication devices 108 each of which correspond to a personal phone, a work phone, a personal computer, and an email retrieval device, respectively, of a single user. Thus, some of the internal communication devices 108 may be connected directly to the enterprise communication network 104 while other internal communication devices 108 may be connected to the untrusted communication network 132. In accordance with at least some embodiments, however, a communication device associated with an enterprise user but not connected to the internal enterprise network 104 may be considered an external communication device 132. Such a device may then initiate calls which are marked with an external identifier thereby allowing the call to be provided with certain features by the internal network device 112, such as an EC-500 feature. Alternatively, each of the communication devices 108, 136 may be owned and operated by (e.g., associated with) a different user.

In general, the communication devices 108, 136 may be adapted to support video, audio, text, and/or data communications with other communication devices 108, 136. The type of medium used by the communication device 108, 136 to communicate with other communication devices 108, 136 may depend upon the communication applications available on the communication device 108, 136.

As can be seen in FIG. 1, it is possible for a communication device to be external from the enterprise network 104 but still be considered an internal communication device 108. This occurs because the communication device 108, while being used outside the enterprise network 104, is registered with an internal or trusted enterprise user. Therefore, certain features may be made available to this user if they initiate a call or receive a call at their communication device 108 which is connected to the untrusted network 132. Such features may be provided by the internal network device 112 based on whether or not the network boundary device 120 marks the call as an internal call or an external call.

Alternatively, a strict definition of internal/external calls and devices may be enforced whereby any communication device not connected to the enterprise network 104 may be deemed an external communication device 132 and any calls initiated therefrom may be marked with an external identifier.

In one or both architectures, calls coming into the enterprise network 104 from the untrusted communication network 132 may be cleaned (i.e., may have any internal/external identifiers contained therein removed) before any further analysis occurs. Thus, in accordance with at least some embodiments of the present invention, a call may have its internal/external identifier cleaned and may subsequently have a new internal/external identifier applied thereto based on the analysis of the call by the network boundary device 120.

In accordance with at least some embodiments of the present invention, the network boundary device 120 may comprise a user mapping table 124 and a marking module 128 that enable the network boundary device 120 to analyze a call coming into the enterprise network 104, determine which entities within the call request are to be marked as internal or external, and mark the call entity based on that determination. As can be appreciated by one skilled in the art, the internal network device 112 may also be adapted to analyze calls, determine if the caller or callee is an internal or external caller or callee, and mark the call as appropriate. Therefore, although not depicted, the internal network device 112 may also comprise a user mapping table 124 and marking module 128.

A network boundary device 120 as provided herein includes any type of device belonging to an enterprise network 104 that maintains some portion of the enterprise user records. Exemplary devices which may be considered a network boundary device 120 include, but are not limited to, SIP Routing Elements, User Relation Elements, Session Border Controllers (SBC's), and proxies. SIP Routing Elements are any device which is capable of establishing the routing and dialplan relationships between SIP sites and/or provides ingress/egress to the enterprise network 104 from/to the untrusted communication network 132. User Relation Elements include any device which is capable of binding users to devices and/or binding users to their applications. Proxies include any device which is capable of taking over call control from the communication devices and serves as a central repository for address translation (name to IP address).

In accordance with at least some embodiments of the present invention, the user mapping table 124 is a user and/or administrator provisioned table that contains information mapping certain enterprise users to one or more authoritative proxies for that user. This information may be provisioned directly in the boundary device 120 or may be automatically populated when a user updates their information in an enterprise database 116 (e.g., the enterprise database 116 may push data updates to the boundary device 120 or the boundary device 120 may periodically poll the enterprise database 116 for recent changes).

In other words, the user mapping table 124 may comprise information that identifies a user (usually via an AOR) and maps that AOR to one or more communication devices. SIP allows an in-domain AOR to be expressed using any of three (or more) aliases. "In-domain" means that a member of any of the domains or subdomains for which the enterprise is authoritative. Each alias may refer to the same user but in a different expression or format. Assigning three AORs per user provides maximum interoperability with classic private enterprise networks, the global PSTN, and the Internet. As an example, the three AORs for the user "John Doe" might be:

3031234567@e.com—This format is called the Enterprise Private Numbering Format. The user part must be a numeric string. It does not include the "+" character but includes the @SIPdomain part. Note: customers may choose E.164 format (without a leading "+") as their private numbering plan or have no private numbering plan alias at all.

+13031234567@e.com—This format is called E.164 International Format. It includes the "+" character in the first position and the @SIPdomain part.

JohnDoe@e.com—This format is called the Alphanumeric Handle Format. It includes the @SIPdomain part and the user part must not be E.164 International Format or Private Numbering Format.

All three forms are considered enterprise canonical because they are core-routable and uniquely represent a single user in every location or site throughout the enterprise network 104. All of these AOR formats and the routing for them are provisioned and some or all of that provisioned information may be maintained in the user mapping table 124.

In operation, the boundary device 120 is adapted to receive a call from either an external communication network 132 or the enterprise network 104. The boundary device 120 then invokes the marking module 128 to analyze the call and identify one or more entities such as the originating device's identifier, the target device's identifier, the originating user's identifier, and the target user's identifier. The marking module 128 takes this information and performs an algorithmic assessment to determine whether the call is an internal call or an external call. The algorithmic assessment may include a comparison against information stored in user mapping table 124 or any other provisioned policy or rules. Based on this determination the marking module 128 then marks one or more headers in the call with an internal/external identifier that will follow the call throughout the enterprise network 104.

Figure 2:
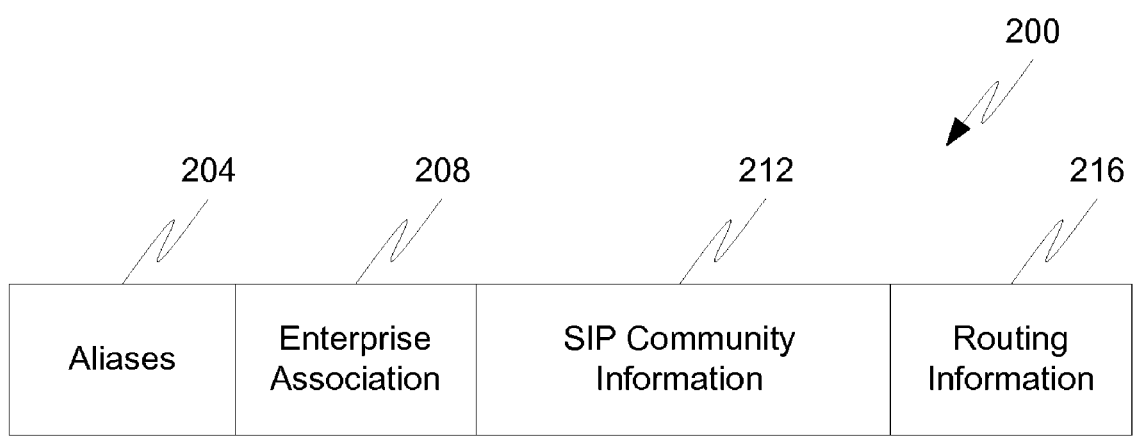
FIG. 2 is a block diagram depicting a data structure used in accordance with at least some embodiments of the present invention.

With reference now to FIG. 2, an exemplary data structure 200 used for marking calls will be described in accordance with at least some embodiments of the present invention. Some or all of the data structure 200 may be provided in the user mapping table 124. The data structure 200 may include one or more fields such as an alias field 204, an enterprise association field 208, a SIP community information field 212, and a routing information field 216. The alias field 204 may be used to store the various aliases used by a particular enterprise user. As noted above there may be three aliases for a particular user (accordingly there may be three rows per user in the table). However, as can be appreciated by one skilled in the art, a greater or lesser number of aliases may be used. For example, a greater number of aliases may be used if a user actually goes by two or more names (e.g., a given name and a nickname).

The enterprise association field 208 is typically associated with a pattern match and number analysis rules used to govern routing behavior exposed by routing information field 216. The enterprise association field 208 may comprise information that identifies whether a particular user, a user's alias, or communication devices associated with that user or alias are internal/external. In accordance with at least one alternative embodiment of the present invention, the enterprise association field 208 may not be necessary. Instead, a call may be identified as internal if a user entry is found in the data structure 200.

The SIP community information 212 field may comprise any type of information that can be used to bind a user to their communication devices and/or applications/features that are to be provided by one or more internal network devices 112.

The routing information 216 field may comprise any type of information that can be used to establish routing and dial-plan relationships between SIP sites (e.g., between various internal network devices 112 capable of offering various SIP services/features).

Figure 3:
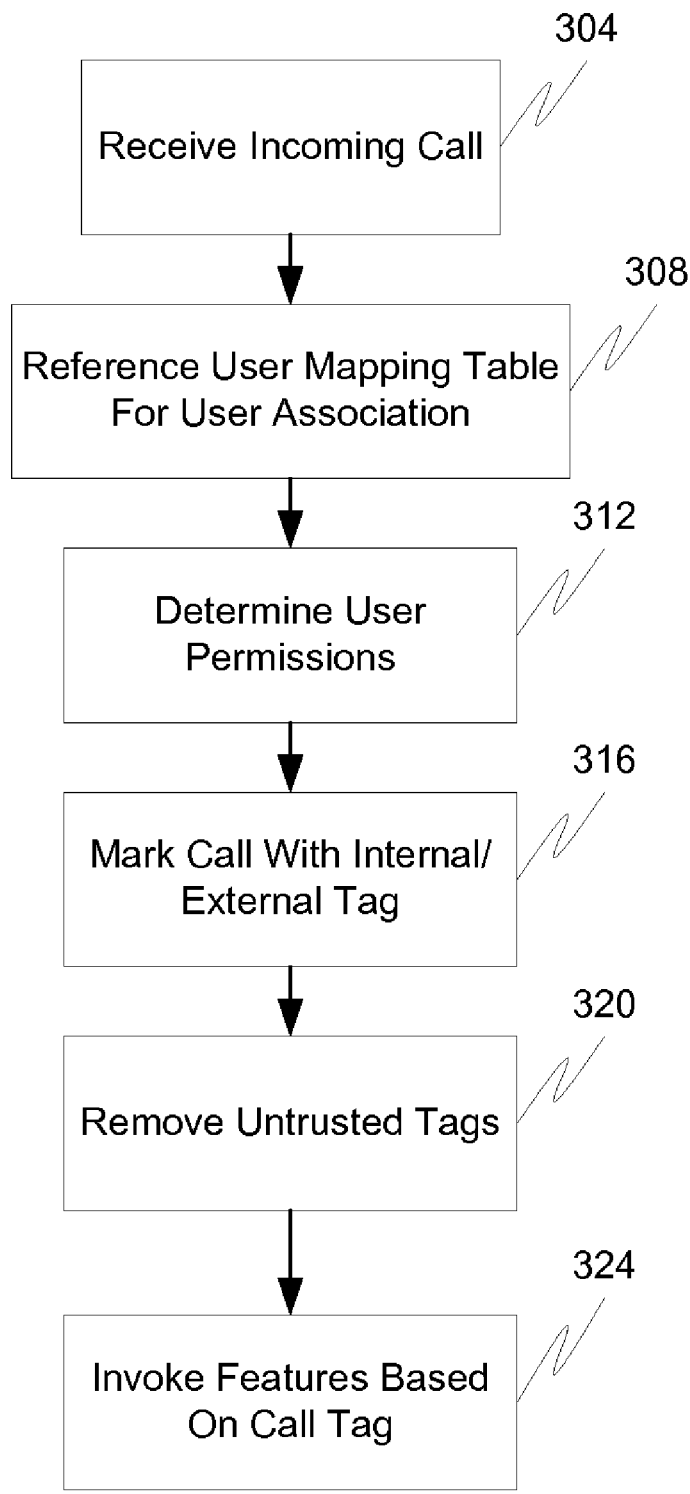
FIG. 3 is a flow diagram depicting a call marking method in accordance with at least some embodiments of the present invention.

With reference now to FIG. 3, an exemplary communication method will be discussed in accordance with at least some embodiments of the present invention. The method is initiated when a call is received at a device which is adapted to mark calls as internal/external (step 304). The device which receives the call may correspond to either a network boundary device 120 or an internal network device 112.

The receiving device 120 invokes the marking module 128, which analyzes the call and references the user mapping table 124 (step 308). This is done to determine whether the call should be marked as internal or external and/or determine any other user permissions/preferences (step 312). By referencing the user mapping table 124 rather than relying upon the path which the call has traveled, the marking module 128 is able to determine whether a call is internal or external regardless of whether or not that call was received at a port associated with the external communication network 132.

Based on the table look-up, the marking module 128 will determine whether to mark the call entities as an internal or external call and will subsequently mark the call with the appropriate internal or external tag (step 316). During this step the marking module 128 may mark one or more headers of the call with an internal/external identifier. More specifically, the marking module 128 may mark the Request URI header, the Contact header (headers for the destination side) and the Public Asserted Identity (PAI) header (header for the caller side). The Contact header may also be marked within SIP response messages. The mark placed in these headers may include any type of marking such as using predefined bits to correspond to internal (e.g., a bit value of '1') and external (e.g., a bit value of '0'). Alternatively, the string "internal" or "external" may be inserted as appropriate into one or more of the headers identified above.

In accordance with at least some embodiments of the present invention it may be advantageous to assure marking both the Request URI and PAI since SIP calls follow the half-call model (i.e., you want to mark both sides of the call so that each half is aware of the call's internal/external properties). Furthermore, by marking a header of the call as discussed above the decoration or marking of the call is achieved at the infrastructure layer (not at endpoints or applications), thereby allowing the mark to follow the call regardless of the endpoint or application used.

Embodiments of the present invention can support various interpretations of internal/external for device or user entities. A first interpretation is directed toward determining whether or not a device is inside or outside an enterprise network. For example, a cellular number would belong to the wireless carrier, and that carrier is "authoritative" for the number and calls to that number must be routed to the carrier. Any calls originated by this device would be tagged as "external" for the originating device entity. Any calls answered by this device would be tagged as "external" for the answering device entity. A second interpretation is directed toward determining whether or not a user entity is internal or external and marking calls based on that determination. Here a number could belong to an enterprise user (e.g., it's the cell phone carried by an enterprise employee). If the employee changes wireless carriers, they could take their number with them and calls from that device may be thought of as "internal." Furthermore, multiple markings may be used to signify the states of the various entities involved in the call such as whether a device is internal/external as well as whether the user is internal/external.

In accordance with at least some embodiments of the present invention, the marking module 128 may also be adapted to remove untrusted tags or markings from a call (step 320). As can be appreciated by one skilled in the art, the marking module 128 may perform this step either before or after the received call has been analyzed and marked with a trusted internal/external identifier. Furthermore, this particular step may be performed in the absence of any other call marking. Accordingly, the marking removal step is an alternative step which does not necessarily rely upon the analysis and marking of the call.

After the entities of the call have been marked with an internal/external identifier and/or cleaned as appropriate, the method continues with the device forwarding the message to an internal network device 112 (if it is not already there) where the appropriate features can be invoked based on the internal/external markings on the entities of the call.

While most details have been described in connection with calls, embodiments of the present invention are not so limited. For example, embodiments of the present invention can be used on any SIP request including, without limitation, presence requests, instant messaging, and other communication services.

Additionally, while embodiments of the present invention have been described in connection with using an assessment algorithm possibly including a table look-up, one skilled in the art will appreciate that embodiments of the invention are not so limited. More specifically, embodiments of the present invention relate to the fact that entities of calls or requests are tagged and not specifically how the device decided to create and apply the tag. Any decision algorithm can be used to determine if an entity should be tagged without departing from the sprit of the present invention.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for marking calls and other contacts based on their origin. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving a call request at a network boundary device;
performing an assessment algorithm on one or more entities of the call request to determine trust and communications handling of the one or more entities;
marking at the network boundary device the one or more entities of the call request with an identifier based on the results of the assessment algorithm;
wherein, when the call request is received at the network boundary device from an external device through an untrusted communication network, the call request is marked as external;
wherein, when the call request is received at the network boundary device from an internal device through the untrusted communication network, the call request is marked as internal;

wherein, when the call request is received at the network boundary device from the internal device through a trusted communication network, the call request is marked as internal; and after marking the call request, forwarding the call request to an internal network device in the trusted communication network, wherein the internal network device refers to the identifier in the call request to determine whether a call feature is to be applied to a call associated with the call request.

2. The method of claim 1, wherein a table is used in connection with the assessment algorithm and wherein the table is stored on the network boundary device.

3. The method of claim 2, wherein the table is populated by provisioning and the table maps an enterprise user to an authoritative proxy for that user.

4. The method of claim 1, wherein marking comprises altering at least one value in a header of the call request and messages belonging to a call created in connection with the call request.

5. The method of claim 4, wherein the header comprises at least one of a destination side header, a caller side header, and a Contact header.

6. The method of claim 5, wherein the one or more entities comprises at least one of 1) a device initiating the call request, 2) a user on whose behalf a device is operating, 3) a user towards whom the call request is being targeted, and 4) a device which has answered the call request and wherein both the destination side header and caller side header of a message belonging to the call are marked with an identifier.

7. The method of claim 1, wherein the call feature comprises an extension to caller feature.

8. The method of claim 1, wherein the call feature comprises altering an alerting preference.

9. A non-transitory computer readable medium encoded with processor executable instructions operable to, when executed, perform the method of claim 1.

10. A communication device, comprising:
memory and a processor for executing instructions stored in memory, the instructions including:
a marking module operable to analyze a contact request received at the communication device, determine an entity of the contact request, execute an assessment algorithm to determine trust and communications handling for the entity of the contact request, and mark the contact request with an identifier based on results of the assessment algorithm, wherein, when the call request is received at the network boundary device from an external device through an untrusted communication network, the call request is marked as external; wherein, when the call request is received at the network boundary device from the internal device through the untrusted communication network, the call request is marked as internal; wherein, when the call request is received at a network boundary device from an internal device through a trusted communication network, the call request is marked as internal; wherein the device is further adapted to forward the contact request to an internal network device after the marking module has marked the contact request, wherein the internal network device is adapted to refer to the identifier in the contact request to determine whether a call feature is to be applied to the contact request or a call created in connection with the contact request.

11. The device of claim 10, further comprising a user table comprising information related to at least one user of a secured network, wherein a table look-up is performed as part of the assessment algorithm, and wherein the table is populated by provisioning and the table maps an enterprise user to an authoritative proxy for that user.

12. The device of claim 10, wherein the marking module is adapted to mark the contact request by altering at least one value in a header of the contact request or messages belonging to a call created in connection with the contact request.

13. The device of claim 12, wherein the header comprises at least one of a destination side header, a caller side header, and a Contact header.

14. The device of claim 13, wherein the entity of the contact requeset comprises at least one of 1) a device initiating the contact request, 2) a user on whose behalf a device is operating, 3) a user towards whom the contact request is being targeted, and 4) a device which has answered the contact request and wherein both the destination side header and caller side header are marked with the identifier.

15. The device of claim 11, wherein the table contains a listing of user Addresses of Record.

16. The device of claim 10, wherein the device is connected to an external network and an internal network.

17. The device of claim 10, wherein the device resides in an enterprise network and also resides behind a boundary device of the enterprise network.

18. The device of claim 10, wherein the feature comprises one or more of an extension to caller feature and altering an alerting preference.

19. The method of claim 1, wherein the assessment algorithm comprises at least one of testing against number-ranges, testing against dial-plans, testing against routing rules, and testing against statements of network policy.

20. The device of claim 10, wherein the assessment algorithm comprises at least one of testing against number-ranges, testing against dial-plans, testing against routing rules, and testing against statements of network policy.

* * * * *